United States Patent Office.

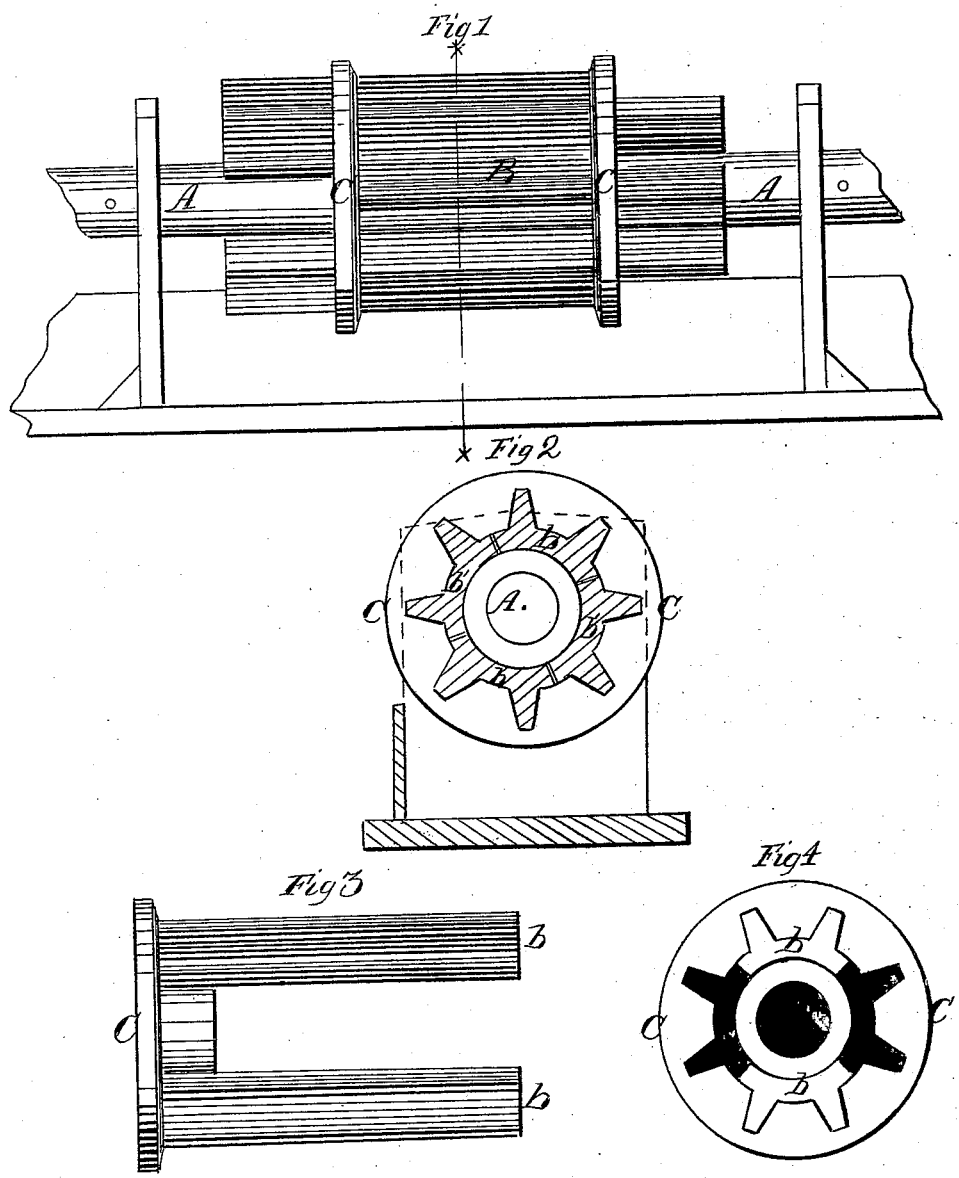

WILLIAM WEUSTHOFF AND CHARLES SCHMIDT, OF DAYTON, OHIO.

Letters Patent No. 92,680, dated July 13, 1869.

IMPROVEMENT IN SEED-WHEELS FOR GRAIN-DRILLS.

The Schedule referred to in these Letters Patent and making part of the same.

*To all whom it may concern:*

Be it known that we, WILLIAM WEUSTHOFF and CHARLES SCHMIDT, of Dayton, in the county of Montgomery, and in the State of Ohio, have invented certain new and useful Improvements in Seed-Wheels for Drills; and do hereby declare that the following is a full, clear, and exact description thereof, reference being had to the accompanying drawings, making a part of this specification, in which—

Figure 1 represents a side elevation of our improved seed-wheel;

Figure 2, a vertical cross-section of the same on the line $x\ x$ of fig. 1;

Figure 3, a side elevation of one-half of the wheel; and

Figure 4, an end view of the same.

Letters of like name and kind refer to like parts in each of the figures.

Our invention relates to a class of seed-drills in which the seed is discharged from the seed-box or hopper by means of a revolving wheel, having upon its periphery a series of cavities which receives the seed from the bottom of said hopper, and, as said wheel revolves, deposits it through other devices upon the ground; and Said invention consists in the peculiar form and construction of the seed-wheel, by means of which the size of the cavities can be so regulated as to enable a larger or smaller quantity of grain to be sowed, as may be desired.

In the annexed drawing—

A represents a shaft, supported in suitable bearings beneath the hopper, upon which the seed-wheels are secured, and with which they revolve.

Each seed-wheel is composed of two parts, B and B', which, when combined, present the appearance shown in figs. 1 and 2, being provided with a series of V-shaped grooves, extending longitudinally along its periphery between two disks C C, which are somewhat larger than the circumference of said wheel.

As before stated, the wheel consists of two parts, which are formed by dividing the grooved portion of the same, radially, into four equal sections $b\ b$ and $b'\ b'$, and attaching alternate sections to each disk C, (as seen in figs. 3 and 4;) suitable openings, corresponding to the size and shape, transversely of said sections, being provided in each disk, through which the sections attached to the opposite disk may pass, so as to permit said disks to be placed at a greater or less distance from each other.

The grain or seed from the hopper being received within the grooves between the disks, it will be readily seen that the capacity of said grooves, and consequently the quality of seed sown, will vary as the distance between said disks is increased or diminished, so that it is only necessary that suitable mechanism be provided for the adjustment of said collars to or from each other, to enable the quantity of grain sown to be regulated with the greatest exactness.

It is believed that this construction of the seed-wheel renders it more effective, durable, and desirable than any in use, and that from the advantages possessed, its general adoption is certain.

Having thus fully set forth the nature and merits of our invention,

What we claim as new, and desire to secure by Letters Patent, is—

The within-described expansible seed-wheel, consisting of the sections $b\ b$, $b'$, and $b'$ and disks C and C, all constructed and arranged to operate substantially as and for the purpose shown.

In testimony that we claim the foregoing, we have hereunto set our hands, this 8th day of May, 1869.

WILLIAM WEUSTHOFF.
CHARLES SCHMIDT.

Witnesses:
JAMES C. YOUNG,
THOS. D. MITCHELL.